United States Patent
Kim et al.

(10) Patent No.: US 11,809,663 B2
(45) Date of Patent: **\*Nov. 7, 2023**

(54) FLAT PANEL DISPLAY WITH INTEGRATED TOUCH SCREEN PANEL

(71) Applicant: Samsung Display Co., Ltd., Yongin-si (KR)

(72) Inventors: Jong-Soo Kim, Yongin-si (KR); Do-Youb Kim, Yongin-si (KR); Myoung-Seop Song, Yongin-si (KR); Sang-Kyun Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,632

(22) Filed: Jan. 14, 2021

(65) Prior Publication Data

US 2021/0132738 A1    May 6, 2021

Related U.S. Application Data

(63) Continuation of application No. 16/677,191, filed on Nov. 7, 2019, now Pat. No. 10,895,926, which is a (Continued)

(30) Foreign Application Priority Data

Sep. 14, 2010    (KR) .................. 10-2010-0089955

(51) Int. Cl.
*G06F 3/044* (2006.01)
*G06F 3/041* (2006.01)

(52) U.S. Cl.
CPC ............ *G06F 3/0443* (2019.05); *G06F 3/041* (2013.01); *G06F 3/044* (2013.01); *G06F 3/0412* (2013.01); *G06F 3/0446* (2019.05)

(58) Field of Classification Search
CPC ... G03C 5/16; Y10S 430/167; Y10S 430/168; G06F 3/041; G06F 3/044; G06F 3/0412; G06F 3/0443; G06F 3/0446; H02G 3/128
See application file for complete search history.

(56) References Cited

U.S. PATENT DOCUMENTS 6,529,188 B1    3/2003   Suzuki
6,885,157 B1    4/2005   Cok et al.
(Continued)

FOREIGN PATENT DOCUMENTS

CN    1591876    3/2005
CN    1729719    2/2006
(Continued)

OTHER PUBLICATIONS

Korean Office Action dated Oct. 30, 2017, issued in the Korean Patent Application No. KR 10-2010-0089955.
(Continued)

*Primary Examiner* — Dmitriy Bolotin
(74) *Attorney, Agent, or Firm* — H.C. Park & Associates, PLC

(57) ABSTRACT

A flat panel display having an integrated touch screen panel directly formed on a sealing thin film is disclosed. In the display, sensing lines of the touch screen panel are formed to extend to a substrate of the display panel, on which organic light emitting elements are formed, so that the touch screen panel and the display panel are connected to a flexible printed circuit board, thereby simplifying manufacturing processes and decreasing product cost.

10 Claims, 3 Drawing Sheets

Related U.S. Application Data continuation of application No. 16/005,694, filed on Jun. 12, 2018, now Pat. No. 10,474,270, which is a continuation of application No. 15/133,605, filed on Apr. 20, 2016, now Pat. No. 10,013,088, which is a continuation of application No. 13/021,581, filed on Feb. 4, 2011, now Pat. No. 9,323,400.

(56) References Cited

U.S. PATENT DOCUMENTS

| | | | |
|---|---|---|---|
| 7,629,740 | B2 | 12/2009 | Sano et al. |
| 7,902,755 | B2 | 3/2011 | Kubota |
| 7,936,121 | B2 | 5/2011 | Kim |
| 8,330,734 | B2 | 12/2012 | Oohira |
| 8,576,182 | B2 * | 11/2013 | Hristov .............. G06F 3/0445 345/173 |
| 8,598,787 | B2 | 12/2013 | Bouten et al. |
| 9,323,400 | B2 | 4/2016 | Kim et al. |
| 9,342,176 | B2 | 5/2016 | Kim et al. |
| 9,377,905 | B1 | 6/2016 | Grivna et al. |
| 10,013,088 | B2 | 7/2018 | Kim et al. |
| 10,474,270 | B2 | 11/2019 | Kim et al. |
| 2002/0171610 | A1 | 11/2002 | Siwinski et al. |
| 2002/0186208 | A1 | 12/2002 | Feldman et al. |
| 2004/0185301 | A1 | 9/2004 | Tsuchiya et al. |
| 2005/0051829 | A1 | 3/2005 | Goto et al. |
| 2005/0172722 | A1 | 8/2005 | Kobayashi et al. |
| 2007/0242055 | A1 | 10/2007 | Lai |
| 2008/0116795 | A1 | 5/2008 | Tsuchiya et al. |
| 2008/0143683 | A1 | 6/2008 | Hotelling |
| 2008/0211975 | A1 | 9/2008 | Sera |
| 2008/0278070 | A1 | 11/2008 | Kim |
| 2010/0007616 | A1 | 1/2010 | Jang |
| 2010/0033443 | A1 | 2/2010 | Hashimoto |
| 2010/0060601 | A1 | 3/2010 | Oohira |
| 2010/0108409 | A1 | 5/2010 | Tanaka et al. |
| 2010/0182249 | A1 | 7/2010 | Kang et al. |
| 2010/0182272 | A1 * | 7/2010 | Kang .............. G06F 3/0446 345/174 |
| 2010/0194699 | A1 * | 8/2010 | Chang .............. G06F 3/0445 345/173 |
| 2010/0194707 | A1 * | 8/2010 | Hotelling .......... G02F 1/13338 345/173 |
| 2010/0214247 | A1 | 8/2010 | Tang et al. |
| 2010/0244073 | A1 | 9/2010 | Ito et al. |
| 2010/0309150 | A1 | 12/2010 | Lee et al. |
| 2011/0012845 | A1 | 1/2011 | Rothkopf et al. |
| 2011/0048812 | A1 * | 3/2011 | Yilmaz .............. G06F 3/0443 178/18.06 |
| 2011/0095999 | A1 | 4/2011 | Hayton |
| 2011/0128240 | A1 | 6/2011 | Choi |
| 2011/0216018 | A1 | 9/2011 | Kim et al. |
| 2011/0298744 | A1 | 12/2011 | Souchkov |
| 2012/0032917 | A1 | 2/2012 | Yamaguchi |
| 2012/0062481 | A1 * | 3/2012 | Kim .............. G06F 3/041 345/173 |
| 2017/0269750 | A1 * | 9/2017 | Kang .............. G06F 3/04164 |
| 2018/0342185 | A1 | 11/2018 | Lee et al. |

FOREIGN PATENT DOCUMENTS

| | | |
|---|---|---|
| CN | 101626017 | 1/2010 |
| CN | 101766055 | 6/2010 |
| JP | 2005-317476 | 11/2005 |
| JP | 2008-091237 | 4/2008 |
| JP | 2008-233976 | 10/2008 |
| JP | 2010-182093 | 8/2010 |
| KR | 10-2008-0099684 | 11/2008 |
| KR | 10-0873080 | 12/2008 |
| KR | 10-2010-0007717 | 1/2010 |
| KR | 10-2010-0010019 | 1/2010 |
| KR | 10-2010-0061121 | 6/2010 |

OTHER PUBLICATIONS

Non-Final Office Action dated May 20, 2016, issued in the U.S. Appl. No. 15/133,605.
Final Office Action dated Jan. 3, 2017, issued in the U.S. Appl. No. 15/133,605.
Non-Final Office Action dated Apr. 21, 2017, issued in the U.S. Appl. No. 15/133,605.
Final Office Action dated Aug. 9, 2017, issued in the U.S. Appl. No. 15/133,605.
Non-Final Office Action dated Nov. 16, 2017, issued in the U.S. Appl. No. 15/133,605.
Notice of Allowance dated Mar. 25, 2017, issued in the U.S. Appl. No. 15/133,605.
Non-Final Office Action dated Jul. 12, 2018, issued in the U.S. Appl. No. 16/005,694.
Final Office Action dated Dec. 31, 2018, issued in the U.S. Appl. No. 16/005,694.
Notice of Allowance dated Jul. 17, 2019, issued in the U.S. Appl. No. 16/005,694.
Non-Final Office Action dated Jun. 11, 2020, in U.S. Appl. No. 16/677,191.
Notice of Allowance dated Sep. 23, 2020, issued in the U.S. Appl. No. 16/677,191.

* cited by examiner

FLAT PANEL DISPLAY WITH INTEGRATED TOUCH SCREEN PANEL

CROSS-REFERENCE TO RELATED APPLICATIONS

This application is a Continuation of Ser. No. 16/677,191, filed on Nov. 7, 2019, which is a Continuation of Ser. No. 16/005,694, filed on Jun. 12, 2018, now issued as U.S. Pat. No. 10,474,270, which is a Continuation of Ser. No. 15/133,605, filed on Apr. 20, 2016, now issued as U.S. Pat. No. 10,013,088, which is a Continuation of U.S. patent application Ser. No. 13/021,581, filed on Feb. 4, 2011, now issued as U.S. Pat. No. 9,323,400, which claims priority from and the benefit of Korean Patent Application No. 10-2010-0089955, filed on Sep. 14, 2010, each of which is hereby incorporated by reference for all purpose as if fully set forth herein.

BACKGROUND

Field

The disclosed technology relates to a flat panel display, and more particularly, to a flat panel display with an integrated touch screen panel.

Discussion of the Background

A touch screen panel is an input device that allows a user's instruction to be inputted by selecting an instruction content displayed on a screen of a display or the like with a user's hand or an object.

To this end, the touch screen panel is formed on a front face of the display and is capable of converting a contact position into an electrical signal. The user's hand or object directly contacts the touch screen panel at the contact position. Accordingly, the instruction content selected at the contact position is inputted as an input signal to the display.

Since such a touch screen panel can be substituted for a separate input device connected to a display, such as a keyboard or mouse, its application fields have been gradually extended.

Touch screen panels may be categorized as a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern, ground electrode or the like when a user's hand or object is in contact with the touch screen panel.

Such a touch screen panel is generally attached to an outer surface of a flat panel display such as a liquid crystal display or organic light emitting display. In a case where a separately manufactured touch screen panel is attached to a flat panel display, the entire thickness of a product is increased, and manufacturing cost is increased.

In this case, a driving IC for a flat panel display and a driving IC for a touch screen panel are separate from the flat panel display and the touch screen panel, and therefore, it is difficult to achieve compatibility between products. Since the driving ICs are necessarily connected to separate flexible printed circuit boards (FPCBs), respectively, a manufacturing process is complicated, and product cost is increased.

SUMMARY

One aspect is a display. The display includes a substrate including a first area having a pixel area and a second area adjacent to the first area. The display further includes a plurality of pixels in the pixel area of the substrate. The display further includes an encapsulation layer on the first area of the substrate, the encapsulation layer including an inclined surface. The display further includes a plurality of sensing cells on the encapsulation layer. The display further includes a plurality of sensing lines on the encapsulation layer, the plurality of sensing lines connected to the sensing cells. The display further includes a driving circuit electrically connected to the sensing cells via the sensing lines. The sensing lines extend from the sensing cells along the inclined surface of the encapsulation layer to the second area of the substrate. The sensing lines are electrically connected to the driving circuit.

Another aspect is a display. The display includes a substrate including a first area having a pixel area and a second area adjacent to the first area. The display further includes a plurality of pixels in the pixel area of the substrate. The display further includes an encapsulation layer on the first area of the substrate to inhibit infiltration of oxygen and moisture into the pixels and including and inclined surface. The display further includes a plurality of sensing cells on an outer surface of the encapsulation layer. The display further includes a plurality of sensing lines on the outer surface of the encapsulation layer and connected to the sensing cells. The display further includes a driving circuit electrically connected to the sensing cells through the sensing lines. The sensing lines extend from the sensing cells along the inclined surface of the encapsulation layer to the second area of the substrate. The sensing lines are electrically connected to the driving circuit.

BRIEF DESCRIPTION OF THE DRAWINGS

The accompanying drawings, together with the specification, illustrate exemplary embodiments, and, together with the description, serve to explain various inventive aspects and principles.

DETAILED DESCRIPTION

Figure 1:
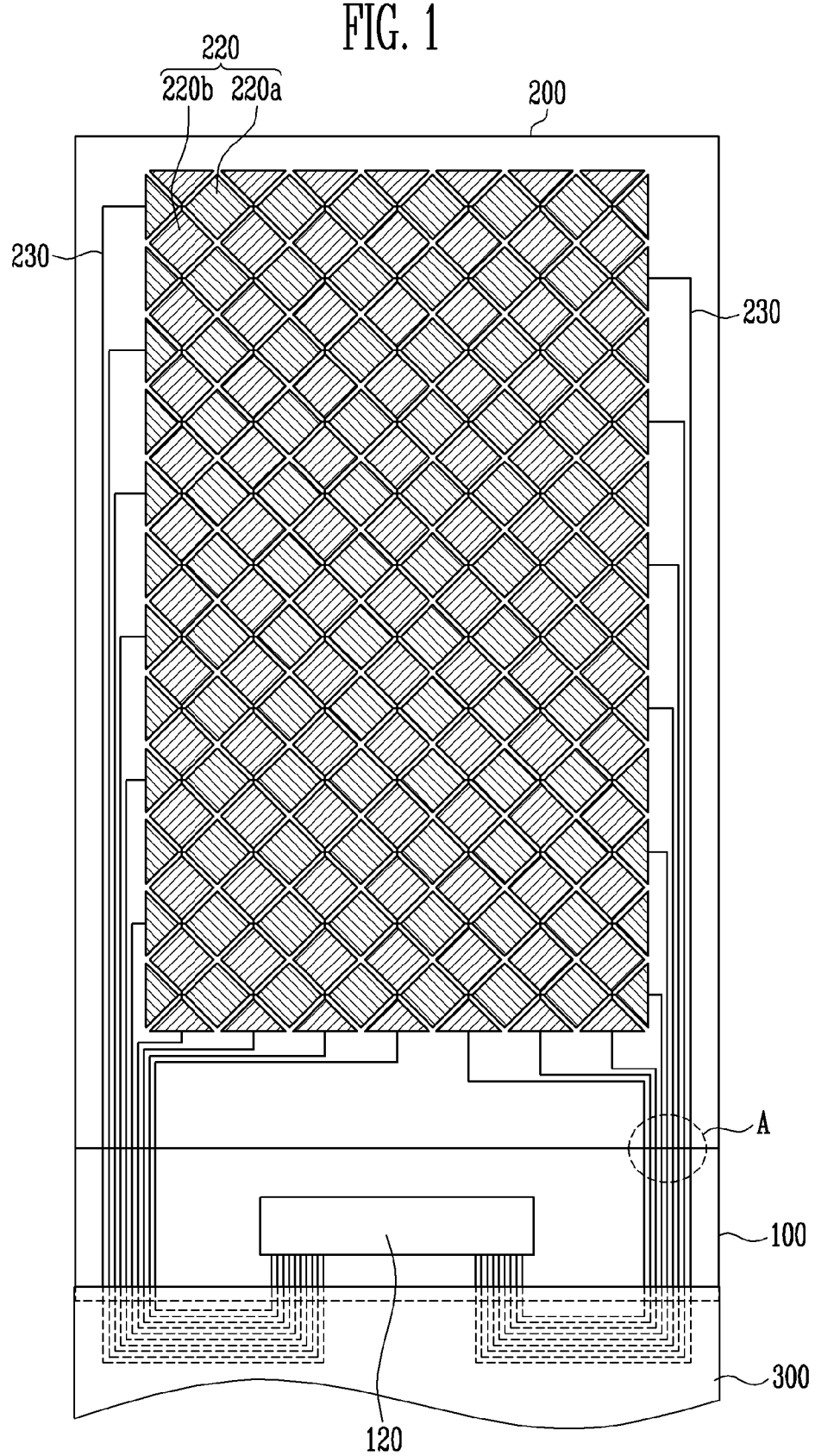
FIG. 1 is a plan view of a flat panel display with an integrated touch screen panel according to an embodiment of the present invention.

In the following detailed description, only certain exemplary embodiments have been shown and described. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals generally refer to like elements.

Hereinafter, exemplary embodiments of the present invention will be described in detail with reference to the accompanying drawings.

Figure 2:
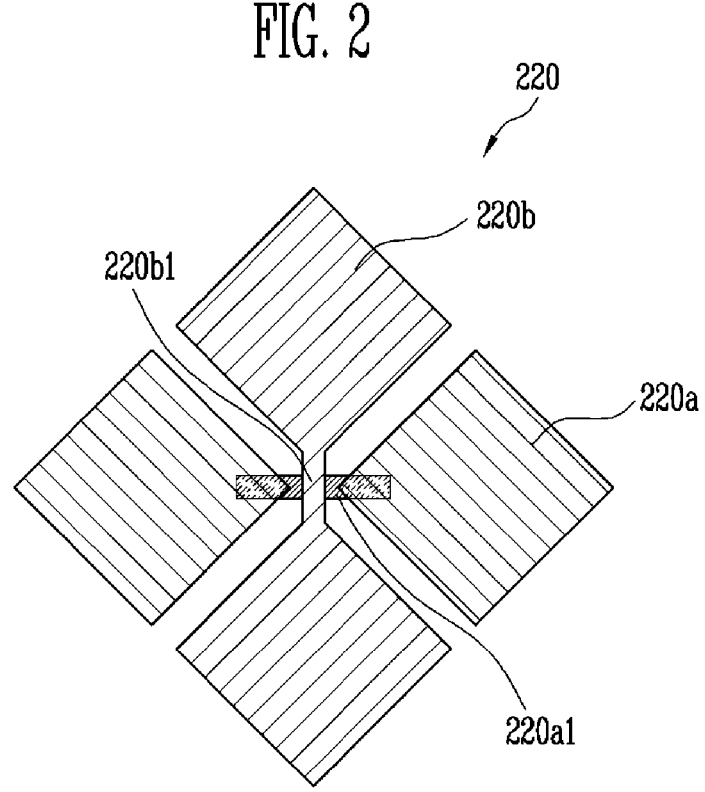
FIG. 2 is an enlarged view showing an embodiment of sensing cells shown in FIG. 1.

FIG. 1 is a plan view of a flat panel display with an integrated touch screen panel according to an embodiment. FIG. 2 is an enlarged view showing an embodiment of sensing cells shown in FIG. 1.

For convenience of illustration, some of the sensing cells are shown in FIG. 2. However, the touch screen panel has a structure in which the sensing cells shown in FIG. 2 are repeatedly arranged.

Referring to FIGS. 1 and 2, in the flat panel display with the integrated touch screen panel according to this embodiment, sensing cells 220 and sensing lines 230 for implementing the touch screen panel are formed on a sealing thin film 200 for sealing a plurality of pixels formed on a substrate 100.

In this instance, the flat panel display according to this embodiment is implemented as an organic light emitting display in which an organic light emitting element, a thin film transistor, and a capacitor are provided to each of the pixels.

Conventionally, in the organic light emitting display, a glass substrate having a cavity or plate pattern is joined with the substrate 100 under a vacuum atmosphere so as to prevent the organic light emitting elements from being exposed to moisture and oxygen.

However, the thickness of the glass substrate as a sealing substrate is large. Therefore, where a touch screen panel is formed on the glass substrate, it is disadvantageous because of the large thickness.

Accordingly, in this embodiment, the sealing thin film 200 including a pixel area of the substrate 100 is formed rather than the conventional sealing substrate for the purpose of protecting the organic light emitting elements, thereby minimizing thickness.

The sensing cells 220 include a plurality of first sensing cells 220a formed to be connected for each row line along a first direction, e.g., a column direction, and a plurality of second sensing cells 220b alternately arranged to not be overlapped with the first sensing cells 220a and formed to be connected for each column line along a second direction, e.g., a column direction, intersected with the first direction.

The sensing cells 220 are formed of a transparent electrode material such as indium tin oxide (ITO) so that light from a display panel disposed below the sensing cells 220 can be transmitted through the sensing cells 220.

As shown in FIG. 2, the first sensing cells 220a are connected to each other along each line in the first direction by a first connection pattern 220a1, and the second sensing cells 220b are connected to each other along each line in the second direction by a second connection pattern 220b1.

Here, the first connection pattern 220a1 and/or the second connection pattern 220b1 are patterned to have independent patterns, respectively. The first or second connection pattern 220a1 and 220b1 may be patterned to be directly/indirectly connected to the first or second sensing cells 220a or 220b, or to be integrally connected to the first or second sensing cells 220a or 220b from a process of patterning the first and second sensing cells 220a and 220b.

For example, the first connection patterns 220a1 are respectively patterned to have independent patterns in an upper or lower layer of the first sensing cells. The first connection patterns 220a1 connect the first sensing cells 220a to one another for each line along the first direction while being electrically connected to the first sensing cells 220a at an upper or lower portion of the first sensing cells 220a.

The first connection patterns 220a1 may be formed of a transparent electrode material such as ITO like the sensing cells 220, or may be formed of a low-resistance opaque metallic material like the sensing lines 230. The width of the first connection patterns 220a1 may be adjusted to prevent them from affecting the visual quality of the display.

The second connection patterns 220b1 may be integrally patterned with the second sensing cells 220b so as to connect the second sensing cells 220b to one another along each line in the second direction from a process of patterning the sensing cells 220.

In this instance, an insulating layer (not shown) for ensuring electrical isolation is interposed between the first connection patterns 220a1 and the second connection patterns 220b1.

The sensing lines 230 are used to connect the sensing cells 220 to a driving circuit for each line along the first or second direction. The sensing lines 230 are arranged in a non-touch active area formed at the outside of a touch active area. Here, the touch active area is an area corresponding to the pixel area of the display panel.

For example, the sensing lines 230 are electrically connected to row lines of the first sensing cells 220a and column lines of the second sensing cells 220b, respectively, so as to be connected to the driving circuit (not shown) of the touch panel, such as a position detecting circuit.

An edge pattern (not shown) such as a black matrix of a window (not shown) may be positioned on the sensing lines 230. Thus, it is possible to prevent the sensing lines 230 from being seen, so that the material of the sensing lines 230 is selected from a large variety of options. For example, the sensing lines 230 may be formed of not only a transparent electrode material used to form the sensing cells 220 but also a low-resistance metallic material such as molybdenum (Mo), silver (Ag), titanium (Ti), copper (Cu), aluminum (Al) or Mo/Al/Mo.

In this embodiment, as shown in FIG. 1, the sensing lines 230 extend to the substrate 100 of the display panel from an end of the sealing thin film 200 so as to be electrically connected to a flexible printed circuit board (FPCB) 300 attached to the substrate 100.

This can be implemented because the thickness of the sealing thin film 200 is sufficiently thin. Particularly, an end portion A of the sealing thin film 200 is formed to be inclined (see FIG. 3), so that it is possible to prevent the sensing lines passing over the end portion from being broken. Hereinafter, this will be described in detail with reference to FIG. 4.

In this instance, the FPCB 300 is electrically connected a driving IC 120 for driving a plurality of pixels (not shown) in the pixel area of the display panel. Accordingly, in this embodiment, the touch screen panel and the display panel use only one FPCB. The driving circuit of the touch panel, which drives the touch screen panel, may be integrated on the driving IC 120.

The touch screen panel configured as described above is a capacitive touch screen panel. If a contact object such as a user's finger or stylus pen comes in contact with the touch screen panel, a change in capacitance caused by a contact position is transferred from the sensing cells 220 to the driving circuit (not shown) via the sensing lines 230. Then, the change in capacitance is converted into an electrical signal by X and Y input processing circuits (not shown), thereby detecting the contact position.

Figure 3:
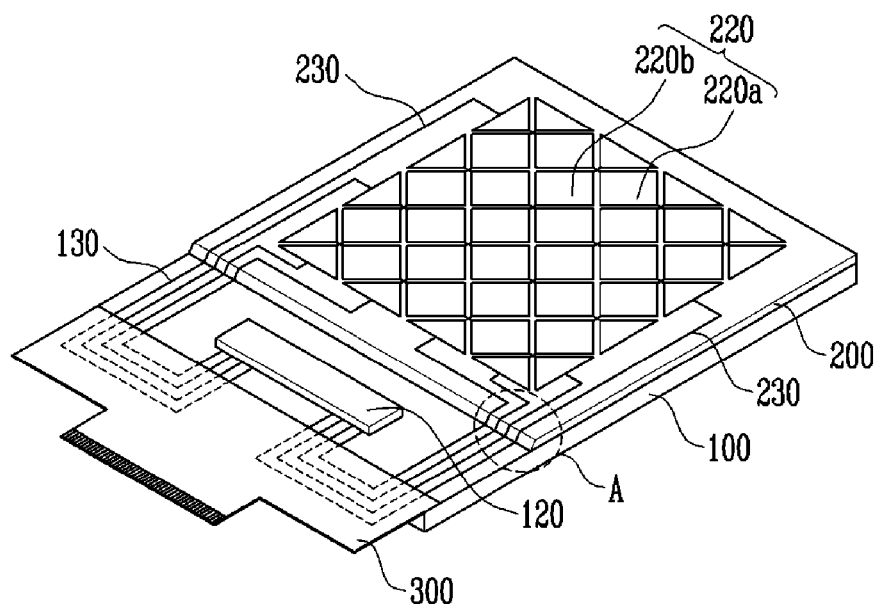
FIG. 3 is a perspective view of a flat panel display with an integrated touch screen panel according to an embodiment of the present invention.
Figure 4:
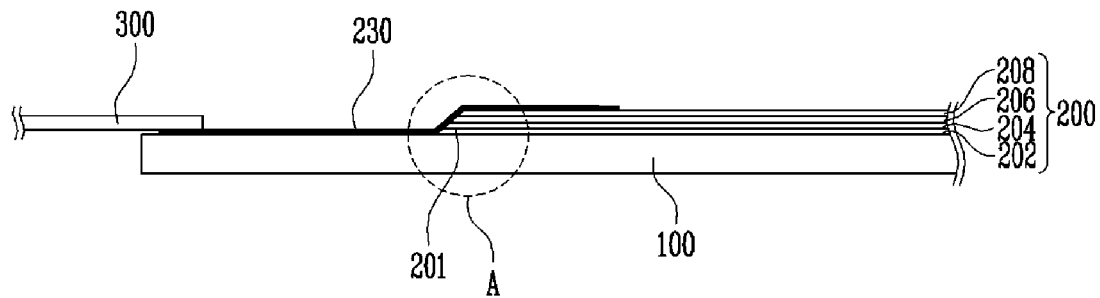
FIG. 4 is a schematic sectional view showing a region including specific portion A of FIG. 3.
Figure 5:
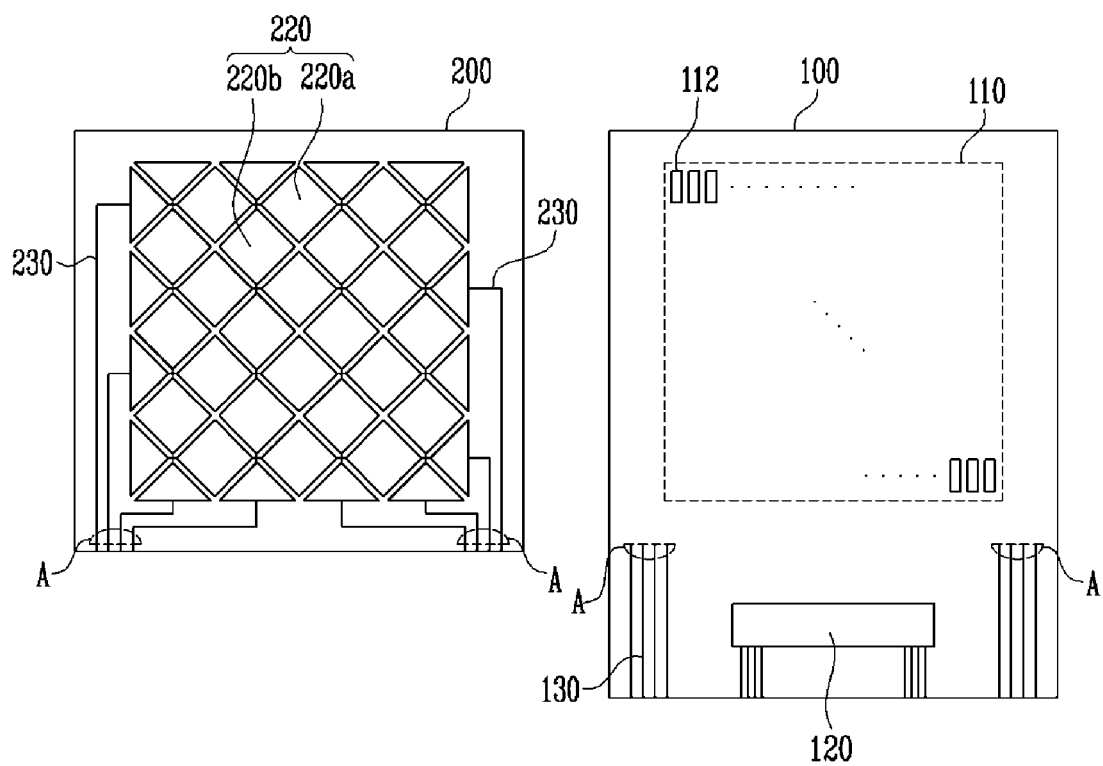
FIG. 5 is a set of separate plan views showing a sealing thin film and a substrate shown in FIG. 3.

FIG. 3 is a perspective view of a flat panel display with an integrated touch screen panel according to an embodiment. FIG. 4 is a separate plan view showing a sealing thin film and a substrate shown in FIG. 3. FIG. 5 is a schematic sectional view showing a region including specific portion A of FIG. 3.

Referring to FIGS. 3 to 5, this embodiment is a flat panel display with an integrated touch screen panel, in which sensing cells 220 and sensing lines 230 for implementing the touch screen panel are formed on a sealing thin film 200 for sealing a plurality of pixels 112 formed on a substrate 100.

Here, the flat panel display according to this embodiment is implemented as an organic light emitting display in which an organic light emitting element (not shown), a thin film transistor (not shown) and a capacitor (not shown) are provided to each of the pixels 112.

That is, touch sensing patterns including the sensing cells 220 and the sensing lines 230 are formed on the top surface of the sealing thin film 200 formed on the substrate 100 including a pixel area 110 so as to seal the pixel area 110 in which the pixels 112 are formed.

In this instance, the sensing cells 220 are formed in an area overlapped with the pixel area 110, and the sensing lines 230 are formed in an area corresponding to the outside of the pixel area 110.

In this embodiment, the sensing lines 230 extend to the substrate 100 of the display panel via an end portion A of the sealing thin film 200, so as to be electrically connected to the FPCB 300 attached to one end of the substrate 100.

This can be implemented because the thickness of the sealing thin film 200 is sufficiently thin. Particularly, the end portion A of the sealing thin film 200 is formed to be inclined, so that it is possible to prevent the sensing lines passing through the end portion from being broken.

The sealing thin film 200 is formed to protect the organic light emitting element provided to each of the pixels 112, and may be implemented as a stacked structure of a plurality of organic and inorganic layers.

More specifically, referring to FIG. 4, the sealing thin film 200 may be formed as, for example, a structure in which a first organic layer 202, a first inorganic layer 204, a second organic layer 206 and a second inorganic layer 208 are alternately stacked so as to effectively block oxygen and moisture from the exterior.

The first and second organic films 202 and 206 of the sealing thin film 200 prevents nano-crack and micro-crack defects formed in the first and second inorganic layers 204 and 208 from being continuously formed, so that it is possible to decrease a moisture transmission rate by preventing an infiltration path of moisture and oxygen and to reduce stress left in the first and second organic layers 204 and 208.

In this instance, the first and second organic layers 202 and 206 may be formed of one selected from the group consisting of epoxy, acrylate and urethane acrylate. The first and second inorganic layers 204 and 208 may be formed of one selected from the group consisting of $Al_xO_y$ and $Si_xO_y$.

Although the sealing thin film 200 is implemented as a stacked structure of four layers, the thickness of the sealing thin film 200 can be implemented to be considerably thinner than that of the conventional sealing substrate, i.e., the conventional glass substrate.

Thus, the sensing lines 230 formed on the sealing thin film 200 can be formed to run over the sealing thin film 200 and the substrate through a process such as the same photolithography process as shown in these figures.

However, a risk exists that the sensing lines 230 that pass through the end portion A of the sealing thin film 200 may be broken by the step difference of the end portion in the patterning process.

Accordingly, in this embodiment, an area 201 of the end portion of the sealing thin film 200 is formed to be inclined as shown in FIG. 4, thereby overcoming such a problem.

That is, the sensing lines 230 extend to the substrate 100 of the display panel via the end portion A of the sealing thin film 200, so as to be electrically connected to the FPCB 300 attached to the one end of the substrate 100.

In this instance, the sensing lines 230 may also be connected to a driving IC 120 of the display panel via the FPCB 300. The driving IC 120 may include a control circuit for driving the touch screen panel, a position detecting circuit, or the like as well as a control circuit for driving the display panel.

Accordingly, the touch screen panel and the display panel share only one FPCB 300 with each other. The FPCB 300 is connected to an end of the substrate 100 (an end at which a pad portion (not shown) is formed) so as to be electrically connected to driving lines (not shown) of the display panel. Thus, the FPCB 300 can supply a control signal for controlling the display panel. Further, the FPCB 300 can supply a control signal for controlling the touch screen panel via the sensing lines 230.

In this case, the FPCB 300 is implemented with a configuration in which an FPCB for driving the display panel and an FPCB for driving the touch screen panel are integrated with each other.

Thus, in this embodiment, the bonding and testing process of the FPCB 300 is simplified, so that it is possible to facilitate manufacturing processes and to decrease product cost, as compared with a case where FPCBs for respectively driving the touch screen panel and the display panel are individually provided.

While certain inventive aspects have been described in connection with certain exemplary embodiments, it is to be understood that the invention is not limited to the disclosed embodiments, but, on the contrary, is intended to cover various modifications and equivalent arrangements.

What is claimed is:

1. A display device, comprising:
   a substrate comprising a first area having a pixel area and a second area adjacent to the first area;
   pixels comprising organic light emitting elements in the pixel area of the substrate;
   a sealing thin film covering the first area of the substrate and including an inclined surface at an end of the sealing thin film;
   sensing cells formed on the sealing thin film and configured to sense a touch;
   sensing lines coupled to the sensing cells and formed on the sealing thin film;
   a driving circuit formed on the second area of the substrate; and
   a flexible printed circuit board (FPCB) attached to one end of the substrate,
   wherein:
   at least one of the sensing lines is disposed on the inclined surface of the sealing thin film and on the second area of the substrate;
   the inclined surface of the sealing thin film is formed to be inclined downwardly toward the driving circuit;
   the at least one of the sensing lines includes an inclined portion along the inclined surface of the sealing thin film;

the sensing lines comprise:
- a first group concentrated in a first line area of the second area of the substrate; and
- a second group concentrated in a second line area of the second area of the substrate;

the first group of the sensing lines and the second group of the sensing lines extend in the second area of the substrate with the driving circuit interposed therebetween;

the sealing thin film comprises at least one organic layer and at least one inorganic layer;

the at least one inorganic layer includes an inorganic layer disposed on an uppermost portion of the sealing thin film;

the sensing lines are formed on the inorganic layer of the sealing thin film in the second area of the substrate;

the sensing lines comprise a metallic material including aluminum and titanium; and the sensing lines are electrically connected to the FPCB at the one end of the substrate.

2. The display device according to claim 1, wherein:
the first group of the sensing lines is closer to a first side of the driving circuit than the second group of the sensing lines; and
the second group of the sensing lines is closer to a second side of the driving circuit opposite to the first side than the first group of the sensing lines.

3. The display device according to claim 2, wherein the FPCB is spaced apart from the driving circuit in the second area.

4. The display device according to claim 2, wherein the first group of the sensing lines and the second group of the sensing lines extend toward the FPCB.

5. The display device according to claim 4, further comprising driving lines configured to drive the pixels and electrically connected to the driving circuit.

6. The display device according to claim 5, wherein the driving lines extend in the second area.

7. The display device according to claim 1, wherein a border between the first area and the second area is divided by the at least one organic layer of the sealing thin film.

8. The display device according to claim 1, further comprising an insulating layer,
wherein:
the sensing cells comprise first sensing cells connected to each other along each line in a first direction and second sensing cells connected to each other along each line in a second direction different from the first direction;
two adjacent first sensing cells are electrically connected by a first connection pattern and two adjacent second sensing cells are electrically connected by a second connection pattern; and
the insulating layer is between the first connection pattern and the second connection pattern.

9. The display device according to claim 8, wherein:
the sensing lines comprise:
first sensing lines electrically connected to the first sensing cells; and
second sensing lines electrically connected to the second sensing cells;
at least one of the second sensing lines included in the first group comprises:
a first portion extending in the second direction from a corresponding second sensing cell; and
a second portion extending in the first direction from an end of the first portion; and
the other at least one of the second sensing lines included in the second group comprises:
the first portion; and
a third portion extending in a direction opposite to the first direction from the first portion.

10. The display device according to claim 9, wherein the first portion, the second portion, and the third portion are formed over the sealing thin film.

\* \* \* \* \*